June 5, 1951

C. B. KIDNEY 2,555,492

PRESSURE FLUID SEAL

Filed Oct. 23, 1947

INVENTOR
CARLETON B. KIDNEY
BY
HIS ATTORNEY.

Patented June 5, 1951

2,555,492

UNITED STATES PATENT OFFICE 2,555,492

PRESSURE FLUID SEAL

Carleton B. Kidney, Easton, Pa., assignor to Ingersoll-Rand Company, New York, N. Y., a corporation of New Jersey Application October 23, 1947, Serial No. 781,662

8 Claims. (Cl. 286—9)

This invention relates to a pressure fluid sealing device for a rotary shaft in machines producing a pressure differential between the opposed sides of the housing wall through which a shaft extends, and more particularly to blowers and the like that operate to move a fluid medium, other than air.

One object of the invention is to provide a means to effectively seal the fluid medium from contamination by a foreign material.

Another object of the invention is to provide a seat in which a sealing fluid under pressure serves a quadruple purpose, namely; to lubricate, to cool, to seal, and to maintain a predetermined space relation between sealing surfaces of the seal.

Another object of the invention is to provide a seal that operates efficiently within a wide range of differential pressures.

A further object is to present a seal that is unaffected by reasonable whipping and lateral motion of the shaft.

Other objects will be in part obvious and in part pointed out hereinafter.

Figures 1, 4, 5:
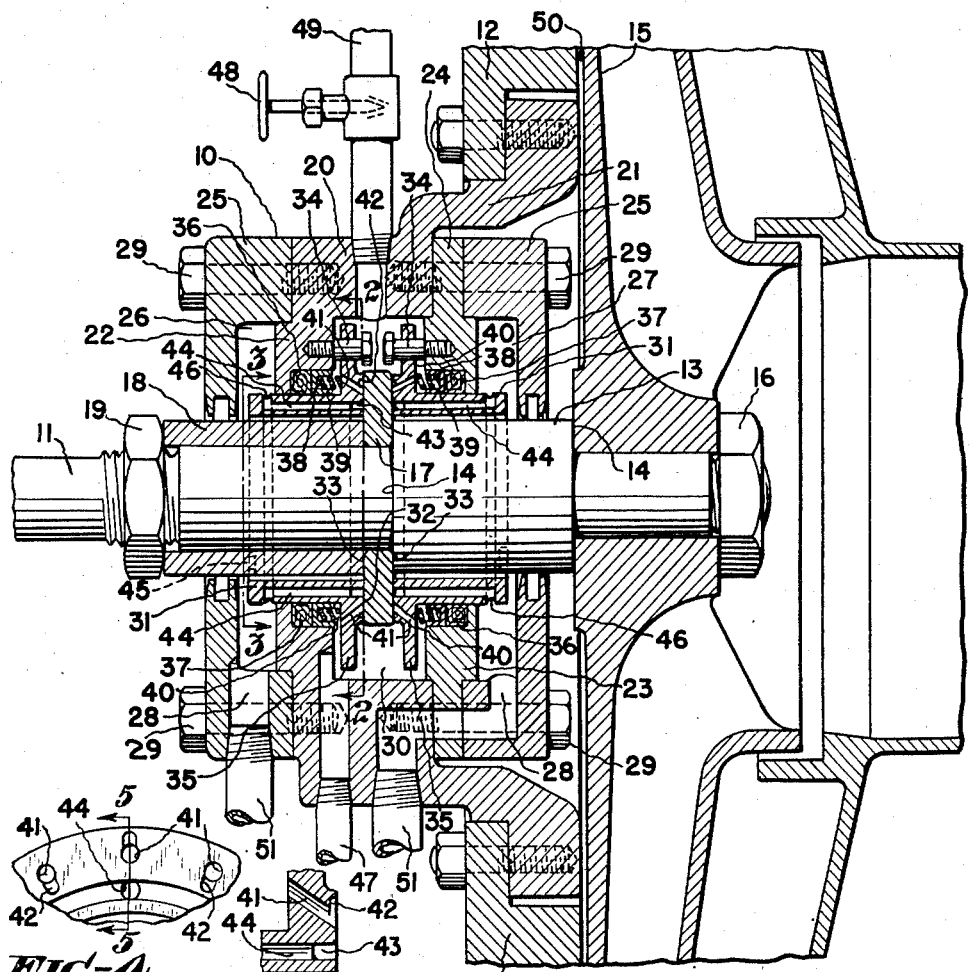
Figure 2:
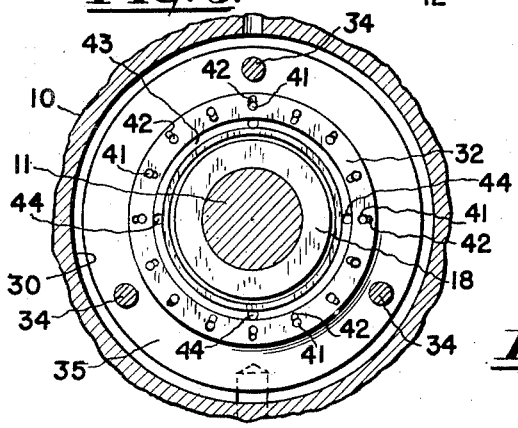
Figure 3:
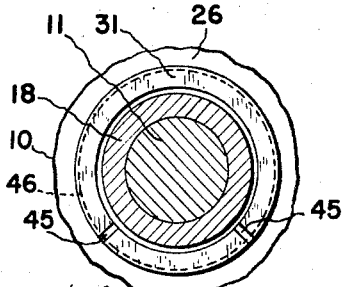

The accompanying drawings illustrate the invention and a particular application thereof, and in which;

Figure 1 is a longitudinal elevation, partly in section, of a blower equipped with the pressure fluid seal, Figure 2 is a transverse view taken through Figure 1 on the line 2—2, Figure 3 is a transverse view taken through Figure 1 on the line 3—3, Figure 4 is an enlargement of a section broken from Figure 2, and Figure 5 is a transverse view taken through Figure 4 on the line 5—5.

Referring more particularly to the drawings, a sealing device, constructed in accordance with the invention and designated in general by 10, is disposed about a shaft 11 adjacent a portion of an impeller casing 12 having a pressure chamber 50 through which the shaft 11 extends.

The shaft 11 has an enlarged portion 13 to provide a pair of opposed shoulders 14. An impeller 15 is positioned against one shoulder and held in fixed relation thereto by a shaft nut 16. A sealing ring 17, encircling the shaft 11, seats against the other shoulder and is held in fixed relation thereto by a shaft sleeve 18 which is pressed against the ring 17 by a shaft nut 19.

The middle section 20 of the seal housing 10 is provided with an external flange 21, bolted to the impeller housing 12, and an internal flange 22, loosely encircling the shaft sleeve 18. A second internal flange 23 is formed by a disc 24 which is perforated to loosely encircle the enlarged portion 13 of the shaft.

An end plate 25 is provided for each opposed end of the section 20 and cooperates with the internal flanges 22 and 23 to form leak chambers 26 and 27, with outlets 28 formed in the lower portion of the leak chambers. The end plates 25 are secured to the seal housing 10 in any conventional manner, such as bolts 29 threaded in the section 20, and in the one instance the outer edge of the disc 24 is interposed between the section 20 and the end plate 25 for rigid positioning therebetween.

A seal chamber 30, formed between the internal flanges 22 and 23, is made pressure containing to accommodate a sealing fluid under pressure. In furtherance of this, a sealing sleeve 31, encircling the shaft 11 and in spaced relation therewith, is provided within each of the internal flanges 22 and 23 and maintain a sliding fit therewith.

It is obvious from the drawing that the sealing sleeves 31, one on each side of the sealing ring, are identical in design and therefore the description hereinafter will be restricted to one of the said sleeves. It is to be understood that the construction is repeated on the opposed side of the sealing ring.

The end of the sealing sleeve 31 extending into the chamber 30 has a contact surface 32 which cooperates with a sealing surface 33 on the sealing ring 17 to effect a seal. The sealing sleeve is held non-rotatable by ridged guide members such as the machine screws 34 fitted through a sleeve flange 35 and threaded into the internal flange 22. To maintain an effective seal during longitudinal motion of the shaft 11, allowed by the thrust bearing, the machine screws 34 are provided with a smooth portion which permits the sealing sleeve 31 to move longitudinally with the shaft, without the danger of binding.

To further insure against binding of the sealing sleeve 31, and to prevent leakage of sealing fluid therealong, a recess 36 around the inner diameter of the internal flange 22 is designed to accommodate a pliable packing ring 37 which bears against the periphery of the sleeve 31. The packing ring 37 is held in position, when the pressure on the sealing fluid is low or non-existent, by springs 38 interposed between a U-shaped ring 39, fitted in the recess 36, and the sleeve flange 35. When the fluid pressure within the chamber 30 is at a normal operating value, a pressure surface on the U-shaped ring 39, exposed to said pressure, exerts sufficient force on the said ring 39 to compress the packing ring 37 into a high pressure sealing relation with the sealing sleeve 31. The springs 38, positioned as described, also act constantly to maintain the sleeve 31 in a proper relation with the sealing ring.

A means for urging the contact surface 32 into sealing relation with the sealing surface 33 is presented by a portion of the sealing sleeve 31, opposed to the contact surface, having a differential pressure surface 40 exposed to sealing fluid under pressure. Ducts 41 lead from the said pressure surface 40 into recesses 42 formed in the contact surface 32. Inward of the recesses an annular groove 43 is cut in the contact surface 32 and is communicated with the leak chamber 26 by the channels 44, which channels are bored longitudinally in the sealing sleeve 31 and have their down stream end portions turned radially outward to terminate in a groove 46 formed in the periphery of the end portion of the sleeve 31 lying within the leak chamber 26. By this arrangement oil flowing through the channels 44 is conducted by the groove 46 to a low point on the sleeve 31 from whence the oil drains into the chamber 26. Oil flowing along the interior of the sleeve 31 is also conducted to the exterior of the sleeve 31 to drain into the chamber 26, and in furtherance to this end, notches 45 are cut in the end surface of the sleeve 31 lying in the chamber 26 and extend radially from the inner to the outer surfaces of said sleeve.

In the operation of the seal, sealing fluid under pressure is supplied to the chamber 30 by an auxiliary pump (not shown but preferably of the gear type) through the inlet pipe 47. The pressure within the chamber 30 is readily varied by a control valve 48 located in an outlet pipe 49. Also the said valve 48 presents a means for controlling the temperature of the seal by regulating the flow of cooling medium, as for example oil, around the seal.

Pressure fluid in the chamber 30 urges the contact surface 32 into sealing relation with the sealing surface 33 by acting on the pressure surface 40. Under normal operating conditions the pressure within the seal chamber 30 exceeds the pressure within the impeller or pressure chamber 50 by an amount, say 150 pounds per square inch, sufficient to insure an effective fluid seal. In the instances where such a high pressure differential exists across the face of the contact surface 32 and sealing surface 33, the said surfaces are jammed together with such force that proper lubrication may be prevented. To alleviate this situation the ducts 41, communicating the pressure surface 40 with the contact surface 32, effectively reduce the pressure area without reducing the pressure differential or narrowing the pressure surface 40.

The ducts 41 also serve as a means for introducing sealing fluid under pressure directly between the sealing surface 33 and the contact surface 32 and within the boundaries of the contact surface 32 to provide more effective lubrication and sealing therebetween. That is, by introducing the sealing fluid under pressure nearer to a point where atmospheric or pump pressure exists, a steeper pressure gradient is obtained. Thus, an increased quantity of sealing fluid will flow shaftward between the contact surface 32 and the sealing surface 33. Such flow prevents any possible counterflow of fluid from the atmosphere or impeller chamber into the chamber 30, and also insures against possible physical contact between the said surfaces under adverse conditions, such as lateral or whipping motion of the shaft.

To further insure adequate lubrication, so necessary at high linear speeds, the recesses 42 are provided in the contact surface 32 and serve to enlarge the ends of the ducts 41. To permit the sealing fluid to be distributed over a large area of the contact surface 32, the recesses 42 extend from the intermediate portion of the annular surface, and more particularly from the ends of the ducts 41, toward one or the other of the opposed boundaries of the annular surface, and preferably alternate recesses extend toward the outer boundary and the remaining recesses extend toward the inner boundary of the contact surface. The recesses 42 also further relieve the pressure acting against the sleeve 31.

The annular grooves 43 serve to entrap sealing fluid as it moves inwardly along the contact surface, thereby preventing the said fluid from leaking onto the shaft 11. The channels 44 convey the sealing fluid from the annular groove 43 to the leak chamber 26. As a further aid in preventing the leakage of sealing fluid onto the shaft 11, the peripheral groove 46 in the sealing sleeve communicates the outlets for the channels 44 and provides a path for the sealing fluid to a low point on the sealing sleeve 31 from which the said fluid drains into the leak chamber 26. In the event any fluid should escape from the peripheral groove 46 and flow onto the end portion of the sealing sleeve 31, the radial notches 45 entrap such leakage and conduct it to the periphery of the sleeve 31 from which the fluid will drain into the leak chamber 26. The sealing fluid is drained from the leak chamber 26 by a drain pipe 51, and, if desired, conveyed to a machine for cleansing the drainage to prepare it for reuse.

I claim:

1. In a seal between relatively rotating machine parts, a housing having a seal chamber therein for sealing fluid under pressure, a sealing ring attached to one of the parts and having a sealing surface, sleeve means slidably mounted on another of the machine parts and having a contact surface to cooperate with the first said surface to effect a seal, a pressure area on the sleeve means exposed to such sealing fluid under pressure for urging the contact surface toward the sealing surface, ducts in the sleeve having an end in the contact surface to introduce the sealing fluid between said surfaces, and a channel formed in the sleeve means inwardly of said ducts to provide an outlet for the said fluid from between said surfaces.

2. A pressure fluid seal comprising a housing, a shaft entering the housing, a sealing ring on the shaft and rotatable therewith and having a sealing surface, a non-rotatable sealing member comprising a sleeve means attached to the housing, an annular surface on the sleeve means and movable into sealing contact with the other said surface, a pressure area on the sleeve means subjected to a sealing fluid under pressure to urge the annular surface toward the sealing surface, ducts formed in the said means and communicating the pressure area with the annular surface to convey sealing fluid under pressure between said surfaces, and recesses in direct communication with the ducts and extending alternately from an intermediate portion of the annular surface toward the opposed boundaries of the annular surface.

3. A pressure fluid seal comprising a housing, a shaft entering the housing, a sealing ring on the shaft and rotatable therewith and having a sealing surface, a non-rotatable sealing member comprising a sleeve means attached to the housing, an annular surface on the sleeve means and movable into sealing contact with the other said surface, a pressure area on the sleeve means subjected to sealing fluid under pressure to urge the annular surface toward the sealing surface, ducts formed in the said means and communicating the pressure area with the annular surface to convey sealing fluid under pressure between said surfaces, recesses formed in the annular surface and in direct communication with the ducts and extending alternately from an intermediate portion of the annular surface toward the opposed boundaries of the annular surface, a ring shaped groove formed in the annular surface to provide an escape means for the sealing fluid, and means to conduct said fluid from the groove to a point exterior of the seal.

4. A pressure fluid seal comprising a housing, a shaft entering the housing, a sealing ring secured to the shaft and having a sealing surface, a non-rotatable sealing member comprising sleeve means in spaced relation around the shaft, an annular surface on the non-rotatable sealing member movable into sealing contact with the other said surface, a pressure area on the non-rotatable sealing member opposed to the annular surface, ducts formed in the non-rotatable sealing member to conduct a sealing fluid under pressure to the annular surface, recesses formed in the annular surface and in direct communication with said ducts, means to convey the pressure fluid from the annular surface and comprising a ring shaped groove formed in the annular surface, a groove formed in the periphery of the sleeve, and a channel formed in the sleeve means and communicating said grooves.

5. A pressure fluid seal comprising a housing, a shaft entering the housing, a sealing ring on the shaft and rotatable therewith and having a sealing surface, a non-rotatable sealing member comprising sleeve means in spaced relation around the shaft, an annular surface on the non-rotatable sealing member movable into sealing contact with the other said surface, a pressure area on the non-rotatable sealing member opposed to the annular surface, ducts formed in the non-rotatable sealing member to conduct a sealing fluid under pressure to the annular surface, recesses formed in the annular surface and in direct communication with said ducts, and means to prevent the flow of pressure fluid inwardly from the recesses onto the said shaft, said means comprising a ring shaped groove formed in the annular surface and radially inward of the recesses, an external annular groove cut in the sleeve to prevent the flow of fluid onto the periphery of the sleeve, and a channel formed in the sleeve to communicate said grooves.

6. A pressure fluid seal comprising a housing with a pressure containing chamber and a leak chamber, a shaft entering the housing, a sealing ring on the shaft and rotatable therewith, a sealing surface on the said ring, sleeve means slidably mounted on the housing and having a contact surface in movable face relation with the sealing surface, a pressure area on the sleeve means and subject to a sealing fluid under pressure to urge the contact surface into a sealing relation with the sealing surface, means in the sleeve means to convey the sealing fluid under pressure between said surfaces, a channel in the sleeve means to conduct the sealing fluid from between the said surfaces to the leak chamber, and radial notches in the end of the sleeve means positioned in the leak chamber to conduct sealing fluid from the inner peripheral surface of the sleeve means.

7. A pressure fluid seal for a shaft rotatable in a pressure chamber comprising, a sealing member on the shaft, a sleeve member having an annular sealing surface cooperative with the sealing member, a housing about said members adapted to receive fluid under pressure higher than the pressure in said chamber, ducts in one of the members leading from the interior of the housing to the sealing surface of said sleeve member to convey pressure fluid thereto, and a groove in the surface of one of said members radially within the ducts to receive fluid flowing over the sealing surface in the direction of said pressure chamber.

8. A pressure fluid seal for a shaft rotatable in a pressure chamber comprising, a sealing member on the shaft, a sleeve member having an annular sealing surface cooperative with the sealing member, a housing defining a seal chamber encasing the sealing member and the inner end of the sleeve and adapted to receive fluid under pressure higher than the pressure in the first said chamber, ducts in one of the members leading from the interior of the housing to the sealing surface of said sleeve member to convey pressure fluid thereto, and longitudinal channels in said sleeve for conveying fluid from said sealing surface of the sleeve member to the outer end of said sleeve.

CARLETON B. KIDNEY.

REFERENCES CITED

The following references are of record in the file of this patent:

UNITED STATES PATENTS

| Number | Name | Date |
|---|---|---|
| 1,315,822 | Doran | Sept. 9, 1919 |
| 1,802,813 | Greenwald | Apr. 28, 1931 |
| 1,871,661 | Carrier | Aug. 16, 1932 |
| 1,927,543 | Doyle | Sept. 19, 1933 |
| 1,930,756 | Heath et al. | Oct. 17, 1933 |
| 1,943,578 | Bigelow et al. | Jan. 16, 1934 |
| 2,247,505 | Kohler | July 1, 1941 |
| 2,265,953 | Mortensen et al. | Dec. 9, 1941 |